(12) United States Patent
Miller et al.

(10) Patent No.: US 10,350,875 B2
(45) Date of Patent: Jul. 16, 2019

(54) PRINTING LAYER IN RESPONSE TO SUBSTRATE CONTOUR

(71) Applicant: NIKE, Inc., Beaverton, OR (US)

(72) Inventors: Todd W. Miller, Portland, OR (US); Jeremy D. Walker, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 291 days.

(21) Appl. No.: 15/287,010

(22) Filed: Oct. 6, 2016

(65) Prior Publication Data

US 2017/0120527 A1 May 4, 2017

Related U.S. Application Data

(60) Provisional application No. 62/248,086, filed on Oct. 29, 2015.

(51) Int. Cl.

| | | |
|---|---|---|
| *B29C 67/00* | (2017.01) | |
| *B33Y 10/00* | (2015.01) | |
| *B33Y 30/00* | (2015.01) | |
| *B33Y 50/02* | (2015.01) | |
| *B29C 64/112* | (2017.01) | |
| *B29C 64/386* | (2017.01) | |
| *A43B 13/00* | (2006.01) | |

(Continued)

(52) U.S. Cl.
CPC .............. *B33Y 10/00* (2014.12); *A43B 13/00* (2013.01); *B29C 64/112* (2017.08); *B29C 64/386* (2017.08); *B33Y 30/00* (2014.12); *B33Y 50/02* (2014.12); *A43B 23/00* (2013.01); *A43D 95/14* (2013.01); *B29C 64/393* (2017.08); *B41J 3/4073* (2013.01)

(58) Field of Classification Search
CPC ... B29C 64/386; B29C 64/393; B29C 64/112; B33Y 10/00; B33Y 30/00; B33Y 50/02; A43B 23/00; A43D 95/14; B41J 3/4073
USPC ...................... 425/174.4, 375; 264/308, 40.1
See application file for complete search history.

(56) References Cited

U.S. PATENT DOCUMENTS

| 7,410,905 B2 | 8/2008 | Ushiyama et al. |
| 2010/0095557 A1* | 4/2010 | Jarvis .................. A43B 1/0027 36/114 |

(Continued)

FOREIGN PATENT DOCUMENTS

| DE | 102010025159 | 12/2011 |
| EP | 2208542 | 7/2010 |

(Continued)

OTHER PUBLICATIONS

International Search Report and Written Opinion, dated Mar. 27, 2017, for corresponding International Patent Application No. PCT/US2016/055883, 12 pages.

*Primary Examiner* — Joseph S Del Sole
*Assistant Examiner* — Lawrence D. Hohenbrink, Jr.
(74) *Attorney, Agent, or Firm* — Klarquist Sparkman, LLP

(57) ABSTRACT

A method of printing a three-dimensional structure onto a base having irregularities on the surface is disclosed. A sensing device determines the depth of the irregularity on the surface. A computing system receives an image file including a predetermined thickness of a layer to be printed onto the base. The predetermined thickness is adjusted based on the depth of the irregularity. A printing device prints a layer onto the base having the adjusted predetermined thickness print on the irregularity to make the surface substantially smooth.

20 Claims, 13 Drawing Sheets

(51) Int. Cl.
*A43B 23/00* (2006.01)
*A43D 95/14* (2006.01)
*B29C 64/393* (2017.01)
*B41J 3/407* (2006.01)

(56) References Cited

U.S. PATENT DOCUMENTS

2013/0280439 A1 10/2013 Hess et al.
2014/0121813 A1 5/2014 Schmehl
2015/0201705 A1 7/2015 Doremus et al.
2018/0071987 A1* 3/2018 Tsumuraya ............. B22F 3/105

FOREIGN PATENT DOCUMENTS

| | | |
|---|---|---|
| EP | 2213462 | 8/2010 |
| WO | WO 2011/148196 | 12/2011 |
| WO | WO 2013/088430 | 6/2013 |
| WO | WO 2013/167528 | 11/2013 |

* cited by examiner

| IRREGULARITIES |||
| --- | --- | --- |
| # | PIXEL LOCATION | DEPTH |
| 502 | X = 2375, Y = 3600 | 12 UNITS |
| 504 | X = 2375, Y = 3601 | 12 UNITS |
| 506 | X = 2375, Y = 3602 | 12 UNITS |
| 508 | X = 2375, Y = 3603 | 12 UNITS |
| 510 | X = 2375, Y = 3604 | 12 UNITS |

FIG. 6

| IRREGULARITIES | | |
|---|---|---|
| # | PIXEL LOCATION | DEPTH |
| 802 | X = 2550, Y = 1180 | 1 UNIT |
| 804 | X = 2550, Y = 1181 | 1 UNIT |
| 806 | X = 2550, Y = 1182 | 2 UNITS |
| 808 | X = 2550, Y = 1183 | 2 UNITS |
| 810 | X = 2550, Y = 1184 | 2 UNITS |
| 812 | X = 2550, Y = 1185 | 2 UNITS |
| 814 | X = 2550, Y = 1186 | 3 UNITS |
| 816 | X = 2550, Y = 1187 | 3 UNITS |

FIG. 9

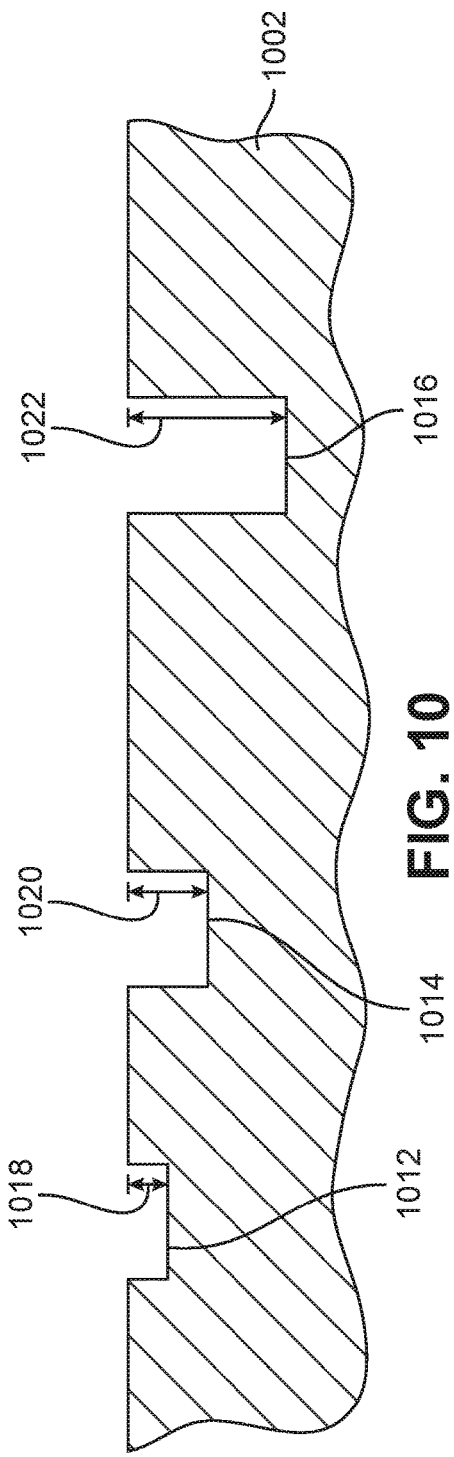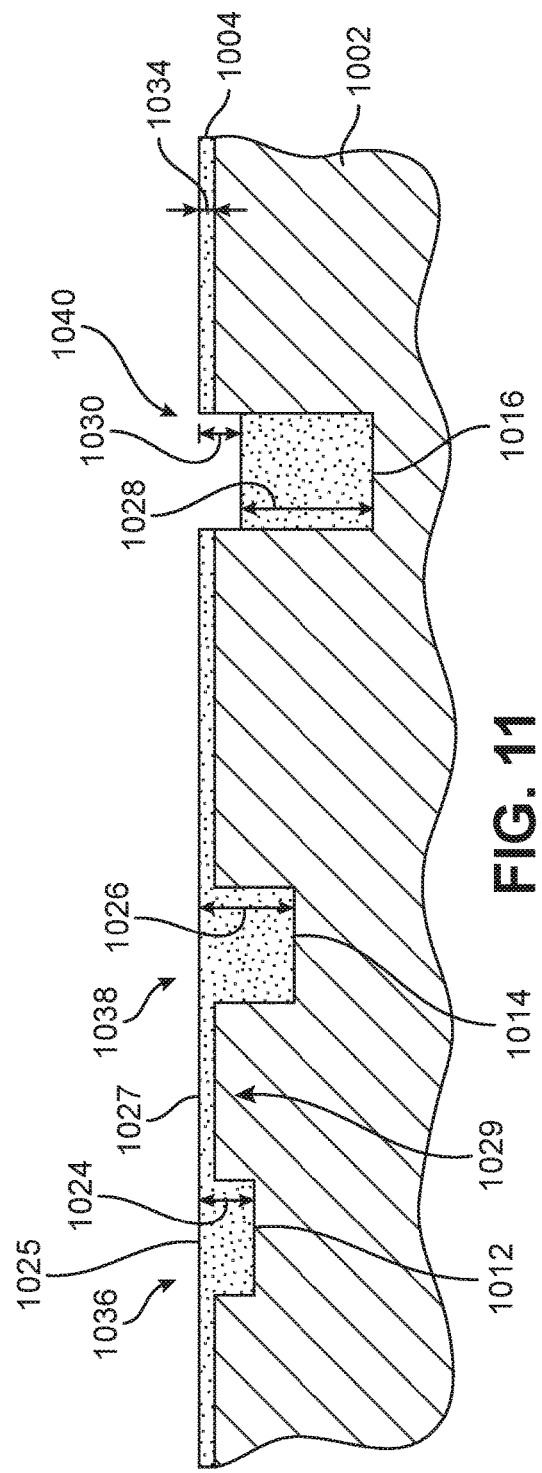

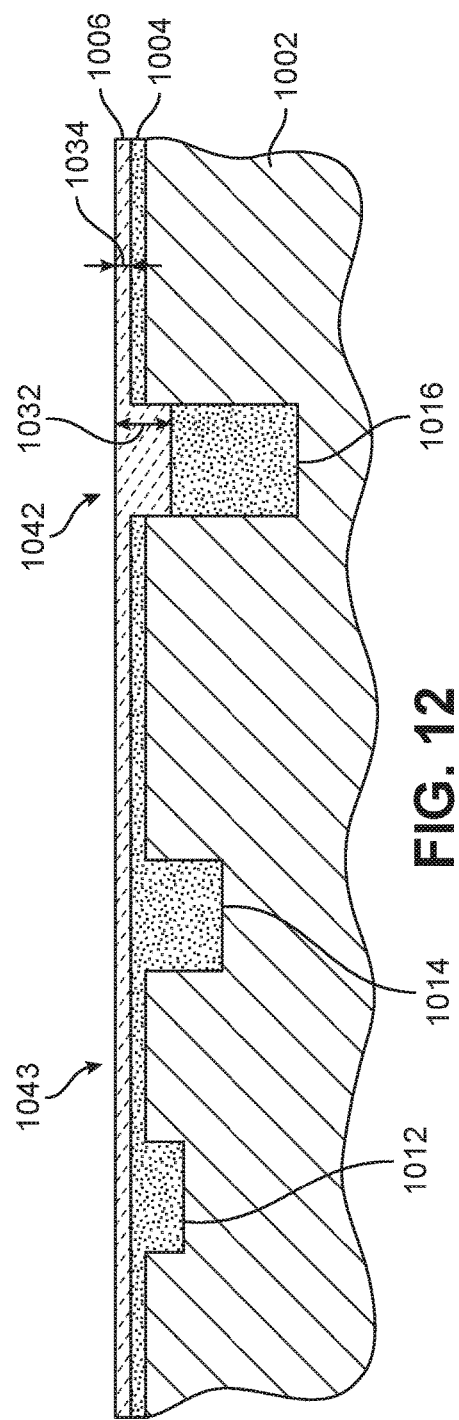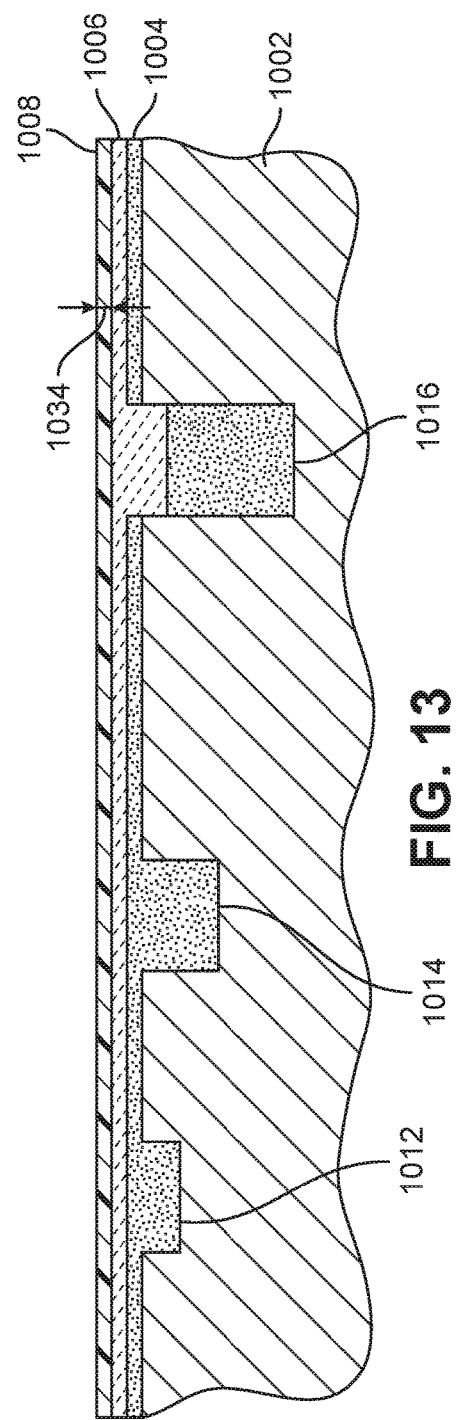

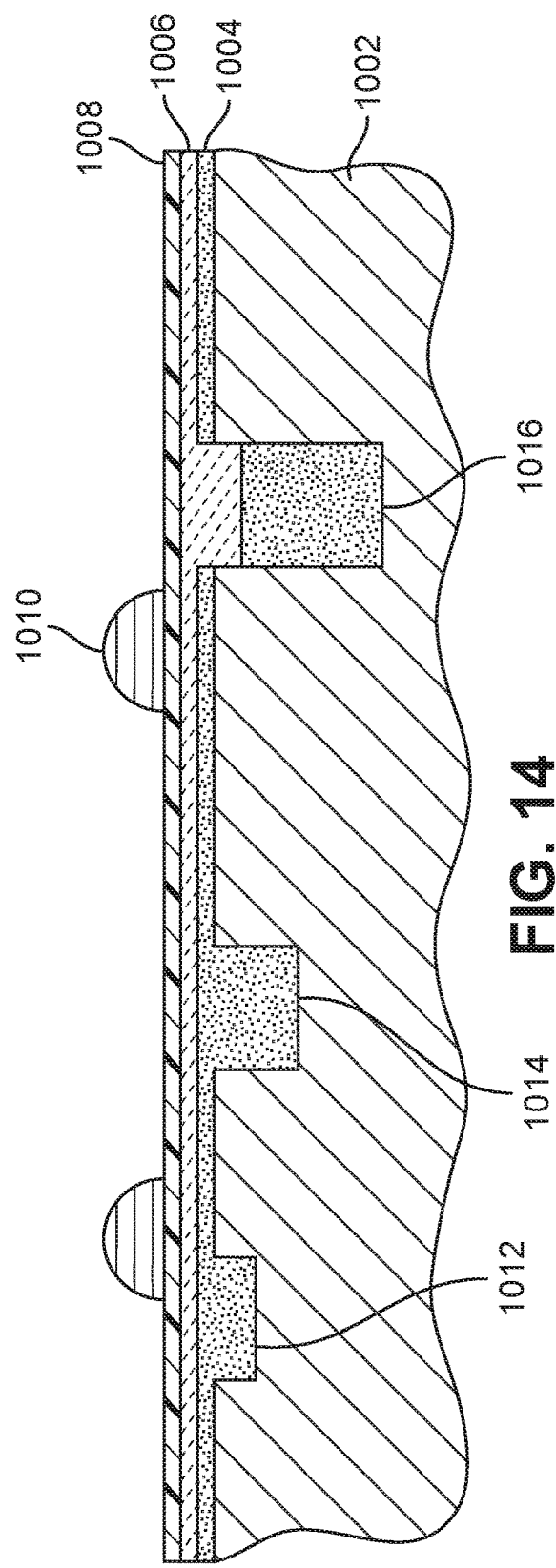

PRINTING LAYER IN RESPONSE TO SUBSTRATE CONTOUR

CROSS-REFERENCE TO RELATED APPLICATION

This application claims priority to Miller et al., U.S. Provisional Patent Application No. 62/248,086, filed on Oct. 29, 2015, the entire disclosure of which is incorporated herein by reference.

BACKGROUND

The present embodiments relate generally to three-dimensional printing systems and methods.

Three-dimensional printing systems and methods may be associated with various technologies, including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 6 is an embodiment of a table showing the pixel locations and depth of the irregularity of FIG. 5;

FIG. 9 is an embodiment of a table showing the pixel locations and depth of the irregularity of FIG. 8;

FIG. 10 is a schematic view of an embodiment of an article of different irregularities;

FIG. 11 is a schematic view of an embodiment of a first layer printed on an article of FIG. 10;

FIG. 12 is a schematic view of an embodiment of a second layer printed on the first layer of FIG. 11;

FIG. 13 is a schematic view of an embodiment of a third layer printed on the second layer of FIG. 12;

FIG. 14 is a schematic view of an embodiment of multiple layers printed on an article.

DETAILED DESCRIPTION

Figure 1:
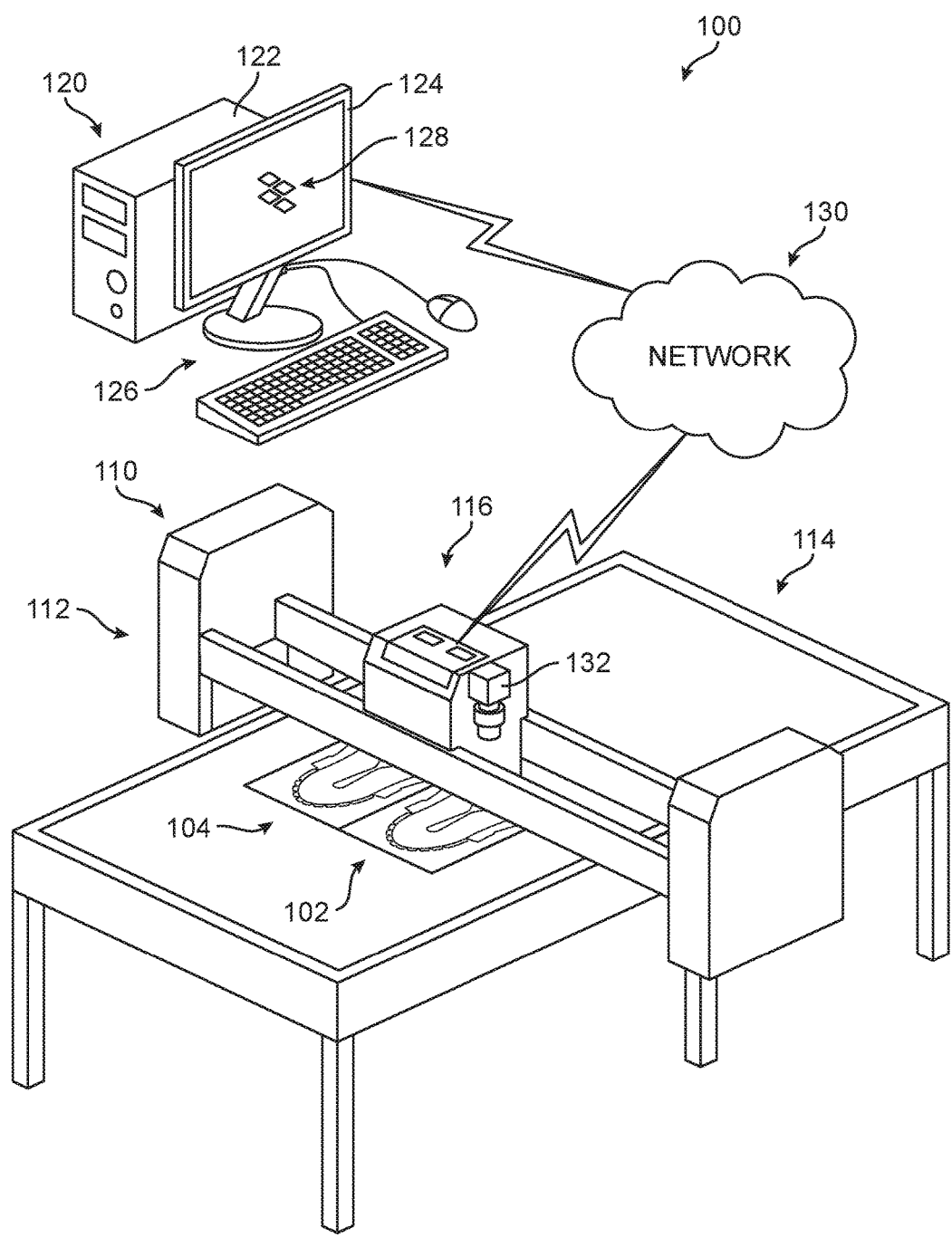
FIG. 1 is a schematic view of an embodiment of components of a printing system as well as several articles that may be used with the printing system.

In one aspect, a method of printing onto a base by receiving the base on a platform and detecting a depth of a cavity on the base with a sensing device. Further, receiving an image file of a structure to be formed on the base. The image file includes a predetermined thickness of a layer. The method further generates a modified image file using the depth of the cavity, and the modified image file includes a first adjusted thickness for a portion of the layer corresponding to the cavity. Then printing a base layer directly onto the base using the modified image file. The base layer includes a first adjusted portion printed within the first cavity and the first adjusted portion has the first adjusted thickness.

In another aspect, a method for printing a three-dimensional structure onto a base by receiving an image file corresponding to a two-dimensional representation of the three-dimensional structure and the image file including a predetermined thickness of a layer. Further, receiving the base having a first cavity with a first depth and a second cavity with a second depth. The method further detecting the first depth of the first cavity and detecting the second depth of the second cavity with a sensing device, and the second depth is greater than the first depth. Then, generating a modified image file using the first depth and the second depth and the modified image file includes a first adjusted thickness of a first portion of the layer corresponding to the first cavity and a second adjusted thickness of a second portion of the layer corresponding to the second cavity. Then printing a base layer directly onto the base using the modified image file. The base layer includes a first adjusted portion printed within the first cavity, and the first adjusted portion has the first adjusted thickness and fills the first cavity. The base layer further includes a second adjusted portion printed within the second cavity, and the second adjusted portion has the second adjusted thickness and partially fills the second cavity thereby forming a third cavity that extends from a top surface of the base layer to a top surface of the second adjusted portion.

In another aspect, a system for printing onto a base having a control system and printing device. The control system configured to receive information about a depth of a cavity on a surface of the base and receive an image file of a structure to be printed on the base. The control system further adjusts the image file based on the depth of the cavity and generates an adjusted image file, which is transmitted to the printing device. The printing device configures to receive the adjusted image file and print a base layer directly onto the base using the adjusted image file.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

FIG. 1 illustrates a schematic view of an exemplary embodiment of components of printing system 100. In some embodiments, printing system 100 may include several components for facilitating the printing of objects (e.g., parts, elements, features, or structures, etc.) on substrate 102. In some embodiments, printing system 100 includes printing device 110, and computing system 120 with network 130. These components will be explained further in detail below. For purposes of illustration, only some components of printing system 100 are depicted in FIG. 1 and described below. It will be understood that in other embodiments, printing system 100 may include additional provisions.

Printing system 100 may utilize various types of printing techniques. These can include, but are not limited to, toner-based printing, liquid inkjet printing, solid ink printing, dye-sublimation printing, inkless printing (including thermal printing and UV printing), MicroElectroMechanical Systems (MEMS) jet printing technologies as well as any other methods of printing. In some cases, printing system 100 may make use of a combination of two or more different printing techniques. The type of printing technique used may vary according to factors including, but not limited to, material of the target article, size, and/or geometry of the target article, desired properties of the printed image (such as durability, color, ink density, etc.) as well as printing speed, printing costs, and maintenance requirements.

In some embodiments, printing system 100 includes printing device 110. In some embodiments, printing device 110 may include features such as housing component 112, tray 114, printhead 116, and sensing device 132. Housing component 112 may be used to support other components, devices, or systems of printing system 100. In some embodiments, housing component 112 may include features to move substrate 102 during operation. In some embodiments, the shape and size of housing component 112 may vary according to factors that include the desired footprint for printing device 110, the size and shape of substrate 102 or multiple substrates, the size and shape of features that may be formed on substrate 102 as well as possibly other factors.

In some embodiments, printing device 110 may include provisions such as a table, platform, tray, or similar component to support, retain, and/or hold substrate 102. In some embodiments, tray 114 may be used to position substrate 102 while layer materials are being deposited onto substrate 102 by a printhead 116. In some embodiments, tray 114 may retain a single substrate 102. In some other embodiments, tray 114 may be so dimensioned and sized such that it can retain additional substrates 104, as shown.

Some embodiments may include provisions to facilitate forming a selectively printed design feature on substrate 102. In some embodiments, printing device 110 may include provisions for depositing a layer material onto substrate 102, such as printhead 116. In some embodiments, printing device 110 may include provisions for applying radiant energy, such as an ultraviolet (UV) lamp (not shown). In one embodiment, printing device 110 includes printhead 116 and a UV lamp to transform a physical property of a layer material and form a selectively printed design feature on substrate 102.

In some embodiments, printhead 116 could be used to deposit an ink layer in order to form a selectively printed design feature onto substrate 102. In some embodiments, printhead 116 could be configured to move and deposit an ink layer within housing component 112 in a horizontal direction (e.g., front-back and/or left-right with respect to housing component 112) onto substrate 102.

In some embodiments, a printing device could include provisions for a sensing device that detects various kinds of information. In some embodiments, a printing device could include provisions for detecting depth information (e.g., the depth of contours in a surface). Such provisions may include, but are not limited to, optical sensing devices as well as other kinds of depth sensing devices that may be known in the art.

In the exemplary embodiment shown in FIG. 1, printing system 100 includes sensing device 132 to detect optical or visual information. Specifically, sensing device 132 may be an optical sensing device. As discussed further below, the optical information captured by sensing device 132 could be used to determine depth information of a nearby surface.

In different embodiments, the location of the sensing device could vary. Sensing device 132 could be static or moving. In some embodiments, for example, sensing device 132 could be stationary and could be disposed above printing device 110. This position could maximize the ability to capture large sections of substrate 102. In some embodiments, sensing device 132 could be located by a separate positioning assembly (not shown). In other embodiments, sensing device 132 could be disposed on or within housing component 112. In the exemplary embodiment, sensing device 132 could be disposed near, or even attached to printhead 116. As printhead 116 is moved, sensing device 132 could therefore travel with printhead 116. Sensing device 132 could move in the same direction as printhead 116 to detect visual and/or optical information of substrate 102. In other embodiments, sensing device 132 could be disposed away from printhead 116. In some cases, sensing device 132 could have a fixed location and/or orientation relative to housing component 112. In other cases, sensing device 132 could have an adjustable location and/or orientation and could be movable independently of printhead 116.

Embodiments can include provisions for detecting optical information about substrate 102, including depth of any irregularities on the surface of substrate 102. The irregularities could be recesses, depressions, cavities, holes, gaps, craters, pits, or any inconsistencies on the surface of the substrate. The substrate could be any article as described in further detail below, or any material that could be used as a base or substrate such as metal, any form of plastics, thermoplastics, or ceramics.

In some embodiments, sensing device 132 may be any kind of device or combination of devices capable of capturing image information and detecting the depth of an irregularity on a surface. Examples of different optical sensing devices that could be used include, but are not limited to, still-shot cameras, video cameras, digital cameras, non-digital cameras, web cameras (web cams), as well as other kinds of optical devices known in the art. The type of optical sensing device may be selected according to factors such as desired data transfer speeds, system memory allocation, desired temporal resolution for viewing a substrate, desired spatial resolution for viewing a substrate as well as possibly other factors. In at least one embodiment, sensing device 132 could be an image sensor having a minimal form factor, for example, an optical sensing device with a complementary metal-oxide-semiconductor (CMOS) image sensor with a footprint on the order of several millimeters or less.

Exemplary image sensing technologies that could be used with sensing device 132 include, but are not limited to, semiconductor charge-coupled devices (CCD), complementary metal-oxide-semiconductor (CMOS) type sensors, N-type metal-oxide-semiconductor (NMOS) type sensors as well as possibly other kinds of sensors. The type of image sensing technology used may vary according to factors including optimizing the sensor type compatible with ambient conditions in printing device 110 (and near or within printhead 116), size constraints as well as possibly other factors. In some other embodiments, optical sensing devices that detect non-visible wavelengths (including, for instance, infrared wavelengths) could also be used.

Sensing device 132 may convert optical images into information transmitted via electrical signals to one or more systems of printing system 100. Upon receiving these electrical signals, the one or more systems can use this information to determine a variety of information about objects that may be visible to sensing device 132.

In different embodiments, detecting the depth of an irregularity on the surface of a substrate could include using a laser to detect the depth. Different kinds of depth detecting devices or sensors could be utilized. Not just optical sensing devices, but any device designed or configured to detect the depth of an irregularity on a surface. For example, reflected light wavelengths could be increased when an irregularity or cavity is detected on the surface of the substrate. In other embodiments, detecting the depth of an irregularity on the surface of a substrate could include provisions of ultrasonic waves to detect the depth. Ultrasonic waves could be emitted onto the surface of the substrate, and the returning waves could be analyzed. For example, if a defect is present on the surface, the ultrasonic waves could reflect sooner than if there were no defects on the surface. Different provisions could be used to detect the depth of an irregularity by comparing the different reflections on the varying surfaces of the substrate. Another example is a measuring device wherein light is projected upon a substrate being examined and the measurement is made by utilizing interference of light reflected from the substrate to determine the depth of the irregularity. Another example of detecting the depth of an irregularity could be spectral reflection characteristics of the return signal are detected and analyzed to determine the depth of the irregularity. Light is projected onto the substrate and any irregularity is detected based on the variation of the intensity of the reflected light. Another example is irradiating a laser beam to the surface of the article and determining when the reflected beam is interrupted temporarily. Any depth detecting device or sensor could be configured with the printing device to detect the depth of an irregularity on the surface of the substrate.

Some printing systems may include provisions to control and/or receive information from printing device 110. These provisions can include computing system 120 and network 130. As used in this detailed description and in the claims, "computing system" and its variants thereof may refer to the computing resources of a single computer, a portion of computing resources of a single computer, and/or two or more computers in communication with one another. Any of these resources can be operated by one or more human users. In some embodiments, computing system 120 may include one or more servers. In some cases, a print server may be primarily responsible for controlling and/or communicating with printing device 110, while a separate computer (e.g., desktop, laptops or tablet) may facilitate interactions with a user (not shown). Computing system 120 can also include one or more storage devices including, but not limited to, magnetic, optical, magneto-optical, and/or memory, including volatile memory and non-volatile memory.

As illustrated in FIG. 1, computing system 120 may comprise central processing device 122, visual interface 124 (e.g., a monitor or screen), input devices 126 (e.g., keyboard and mouse), and software for designing a computer-aided design ("CAD") representation 128 of a printed structure. In at least some embodiments, the CAD representation 128 of a printed structure may include not only information about the geometry of the structure but also information related to the materials required to print various portions of the design feature and the number of layers required to achieve the structure.

In some embodiments, computing system 120 may be in communication with printing device 110 through network 130. Network 130 may include any wired or wireless provision that facilitate the exchange of information between computing system 120 and printing device 110. In some embodiments, network 130 may further include various components such as network interface controllers, repeaters, hubs, bridges, switches, routers, modems, and firewalls. In some cases, network 130 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 130 could be a wired network including networks whose signals are facilitated by twister pair wires, coaxial cables, and optical fibers. In still other cases, a combination of wired and wireless networks and/or connections could be used.

In some embodiments, printed structures may be printed directly to one or more substrates or articles. The term "articles" is intended to include both articles of footwear (e.g., shoes) and articles of apparel (e.g., shirts, pants, etc.). As used throughout this disclosure, the terms "article of footwear" and "footwear" include any footwear and any material associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, natural fabric, synthetic fabric, knit, woven material, nonwoven material, mesh, leather, synthetic leather, polymer, rubber, and foam.

In order to apply printed materials directly to one or more articles, printing device 110 may be capable of printing onto the surfaces of various kinds of materials. Specifically, in some cases, printing device 110 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, non-woven material, mesh, leather, synthetic leather, polymers, rubbers, and foam.

Printing system 100 may be operated as follows to provide three-dimensional structures that have been formed using a layering process. Computing system 120 may be used to design a three-dimensional structure. This may be accomplished using some type of CAD software, or other kind of software. The design may then be transformed into information that can be interpreted by printing device 110 (or a related print server in communication with printing device 110). The structure could be any shape or geometry and could be produced from a three-dimensional model or electronic data source.

Although the embodiments shown in the figures depict a system using inkjet printing technologies, it will be understood that still other embodiments could incorporate any kind of printing technology or different kinds of three-dimensional printing technologies. Before printing, an article may be placed onto tray 114. Once the printing process is initiated (by a user, for example), printing device 110 may begin depositing material onto the article. This may be accomplished by moving printhead 116 to build up layers of a structure using deposited material. Generally, embodiments could apply any kind of print material to a substrate. As used herein, the term "print material" refers to any material that can be printed, and includes inks as well as resins, plastics, or other print materials associated with 2D and/or 3D printing. In some embodiments, the materials used in the printing technology could be any aqueous ink, dye-based ink, pigment-based ink, solvent-based ink, dye sublimation ink, thermoplastic material, acrylic resin, polyurethane, thermoplastic polyurethane, silicone, or any other curable substance.

Figure 2:
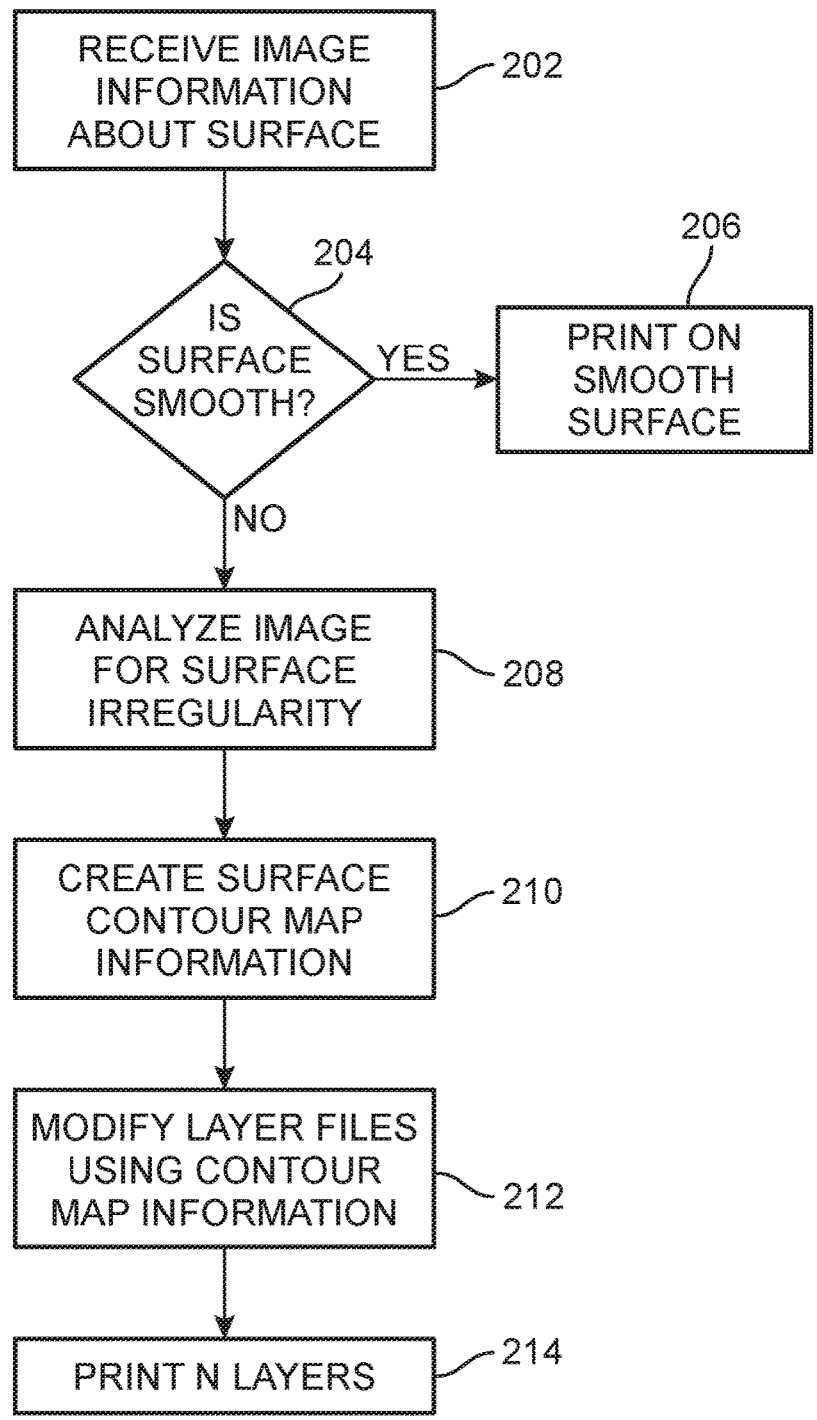
FIG. 2 is an embodiment of a process of printing on an article having irregularities.

FIG. 2 illustrates an embodiment of a process for printing on an article having irregularities. Generally, one or more of the steps depicted in FIG. 2 may be performed by computing system 120, sensing device 132, and/or any other system or component of printing device 110. In other cases, some of the following steps could be performed by any other system or device. In addition, the order of steps could vary in any manner in other embodiments. In some embodiments, the process of FIG. 2 may include additional steps, while in other embodiments some steps depicted in FIG. 2 may be optional. For purposes of clarity, the following discussion describes steps in this process as being performed by a control unit. As used herein, the term "control unit" or "electronic control unit" refers to any set of resources (e.g., hardware and/or software) capable of controlling one or more systems or components. A control unit could be a central processing device, such as central processing device 122 shown in FIG. 1. Alternatively, a control unit could be separate from central processing device 122, and could be integrated with printing device 110, a remote computing system, and/or a server of some kind.

In a first step 202, a control unit may receive image information corresponding to a surface of substrate 102. In some embodiments, the image information may be received from one or more sensors, such as sensing device 132. The received image information could include any kind of analog and/or digital signal that include information related to one or more images captured by sensing device 132.

In step 204, the control unit may use the image information to determine if the surface is smooth. For example, in some embodiments, the surface of substrate 102 may have no irregularities or have a planar surface. Then, printing device 110 proceeds to printing in step 206. If the surface is not smooth, then the control unit, using image information provided by sensing device 132, continues to analyze the image of substrate 102 for surface irregularity in step 208.

In step 210, surface contour map information may be created. The contour map information may be used to detect the depth of any irregularity and provide the depth amount of the irregularity on the surface of substrate 102. The depth amount or information may be a distance from the surface to a viewpoint of sensing device 132. In some embodiments, the surface of substrate 102 may be the planar or smooth surface portion of substrate 102. In other embodiments, the surface of substrate 102 may be the surface of the irregularity of substrate 102. Sensing device 132 could detect the depth of the irregularity using any of the technologies mentioned earlier.

Computing system 120 could receive information to print an image, graphic, or structure on substrate 102. The image, graphic, or structure to be printed could be any 2D layer showing an image or a 3D structure/object of some kind. In some embodiments, the information may be images or graphic files, grayscale files, or any other kinds of files representing the structure to be printed. Image files may be any kind of file format providing image compression of the structure to be printed. For example, the files could be tagged image file format (tiff), joint photographic experts group (jpeg), graphics interchange format (gif), portable network graphics (png), bitmap file (bmp), photoshop document (psd), portable document format (pdf) file or any other kind of file format providing image compression to reduce the amount of storage space required in computing system 120.

In some embodiments, computing system 120 could receive grayscale files representing information of a structure to be printed on substrate 102, or it could convert an image file to a grayscale file. The grayscale file could have any of the file formats previously discussed. The grayscale file contains an image in which the value of each pixel carries intensity information. A grayscale file contains only shades of gray and no color. In some embodiments, the intensity of light could be measured at each pixel to determine the grayscale. The darkest possible shade is black, which is the total absence of transmitted or reflected light or weakest intensity. The lightest possible shade is white, the total transmission or reflection of light or strongest intensity. In other embodiments, the intensity of a pixel could also be expressed in percentages. The percentile notation is used to denote how much ink is employed or deposited onto the substrate. For example, 0% intensity of a pixel is represented by no print material deposited onto the substrate. Further, 100% intensity of a pixel is represented by a maximum amount of print material that could be deposited on the substrate for given settings or physical constraints of a printing system. Computing system 120 could receive any type of information or compute any type of files to print an image, graphic, or structure on substrate 102.

In the foregoing discussion, layer files could be any graphic or image file, grayscale file, or any other kind of file containing information of a structure to be printed onto a substrate. The layer files may contain information pertaining to the predetermined thickness for each layer. Printing device 110 could print a layer file multiple times to create the desired image, graphic, or structure on the substrate. In step 212, the layer files could be modified to fill the irregularity on the surface of the substrate with a depositing material. The layer files could be modified based on the surface contour map information created in step 210. The control unit may utilize the surface contour map information to modify or adjust the predetermined thickness of a layer file based on the depth amount of the irregularities. The layer file could be modified at the position or location of the irregularity. The other positions or locations of the layer file could maintain their predetermined thickness. In step 212, each layer file could be adjusted or modified in a similar manner or could be modified differently depending on the depth amount of the irregularity.

In some embodiments, the layer file could contain information in which the layer has the same predetermined thickness at all positions or locations. In other embodiments, the layer file could be a grayscale file containing information in which the layer has different or varying predetermined thicknesses depending on the grayscale of the image. For example, the grayscale file could establish a relationship between color and thickness. For lighter regions of an image, the printer could print thinner layers, and for darker regions of the image, the printer could print thicker layers. Printing device 110 could print the grayscale file multiple times in layers, thereby a three-dimensional structure could be printed onto the substrate. For example, the grayscale file could have a region of the image being 0.1 mm thick. That region of the image could reach a height ranging from 1 mm-3 mm thick. The grayscale file could contain any combination of information depending on the structure to be printed. For example, the grayscale file could have a portion or region of the image with 40% intensity of a pixel. Then that region of the layer could be 0.04 mm thick. Printing device 110 could be programmed to print 10 layers, then that region of the image could be 0.4 mm thick after printing the same file 10 times. Another region could show 100% intensity of a pixel, and then this portion of the layer could be 0.1mm thick. Printing device 110 could be programmed to print 10 layers, and then this region of the image could be 1.0 mm thick after printing the same file 10 times. Printing device 110 prints the entire grayscale file containing different amounts of information for each region, such as 40% intensity in a region and 100% intensity in another region. In one embodiment, a three-dimensional structure could be printed onto the substrate from one single image file, grayscale file, or other file containing image information. Computing system 120 could send information to print a predetermined number of layers to achieve the three-dimensional structure. Computing system 120 could program the thickness of each region to a predetermined thickness depending on the shape of the three-dimensional structure. The grayscale file could be modified to print onto the substrate and fill the irregularity to make the substrate substantially planar or smooth. The grayscale files could be dynamically modified or adjusted depending on any detection of irregularities of the surface. Examples of grayscale files representing images or structures are disclosed in U.S. Application Ser. No. 15/609,220, filed on May 31, 2017, the entirety of which is incorporated by reference herein.

Then in step 214, printing device 110 may print each modified layer file. The control unit may provide the information of the modified layer files to printing device 110 via network 130. In some embodiments, printing device 110 may print a first modified layer file directly onto substrate 102. The modified layer files could be printed repeatedly until the surface of the substrate is substantially smooth.

Figure 3:
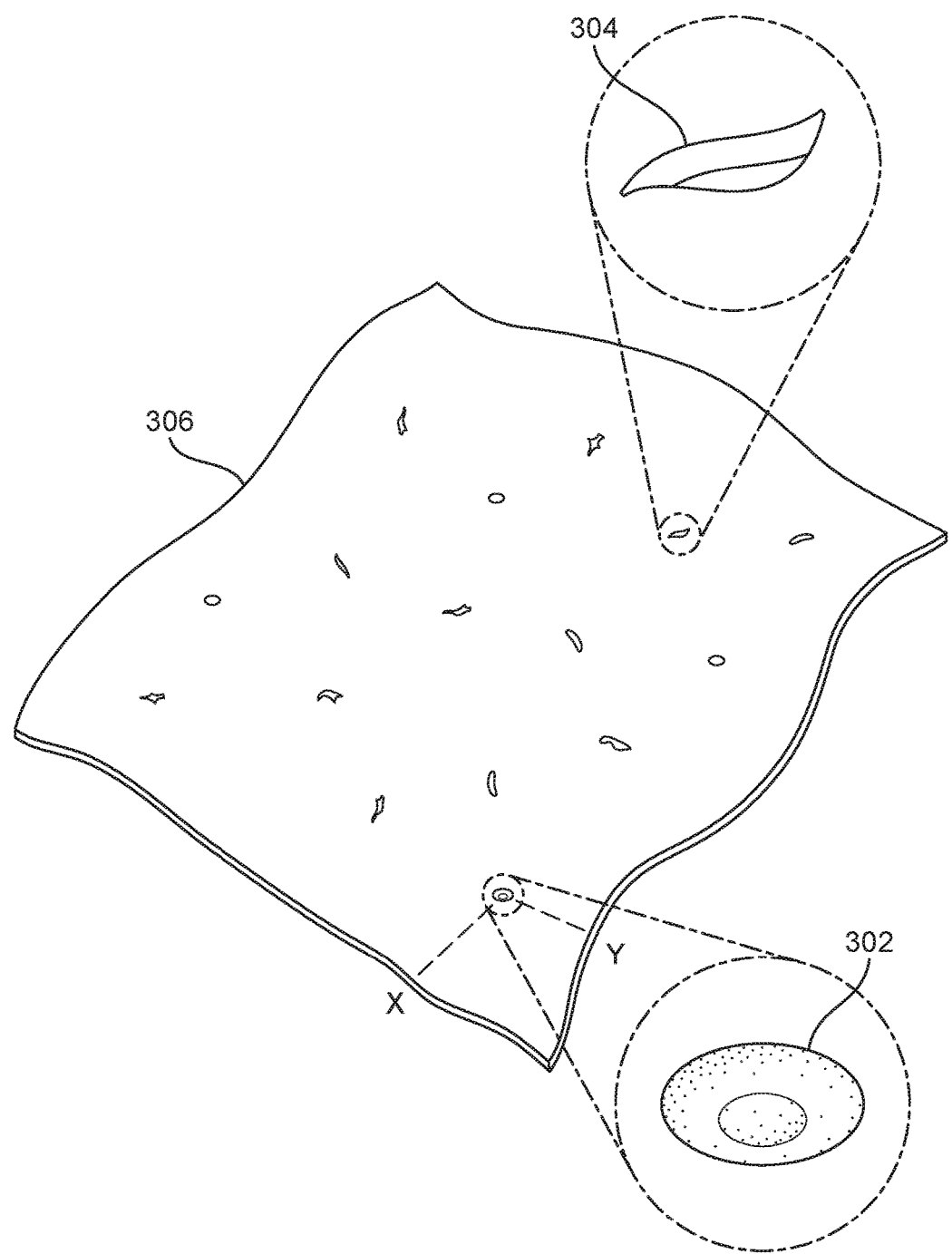
FIG. 3 is a schematic view of an embodiment of an article having irregularities on the surface.

FIG. 3 illustrates a schematic view of an article having irregularities on the surface. In some embodiments, the article may be used as an upper of a shoe. The upper material may be of any type of material, such as synthetic leather, leather, textile, or knit. In the exemplary embodiment, synthetic leather article 306, hereinafter referred to as article 306, may have an irregularity shown as a deep groove 304. Also, article 306 may have an irregularity shown as a shallow groove 302. Throughout article 306, there could be multiple grooves of varying depth. The position of shallow groove 302 may be designated by X and Y coordinates. Similarly, the position of deep groove 304 and other grooves may be designated by X and Y coordinates.

Figure 4:
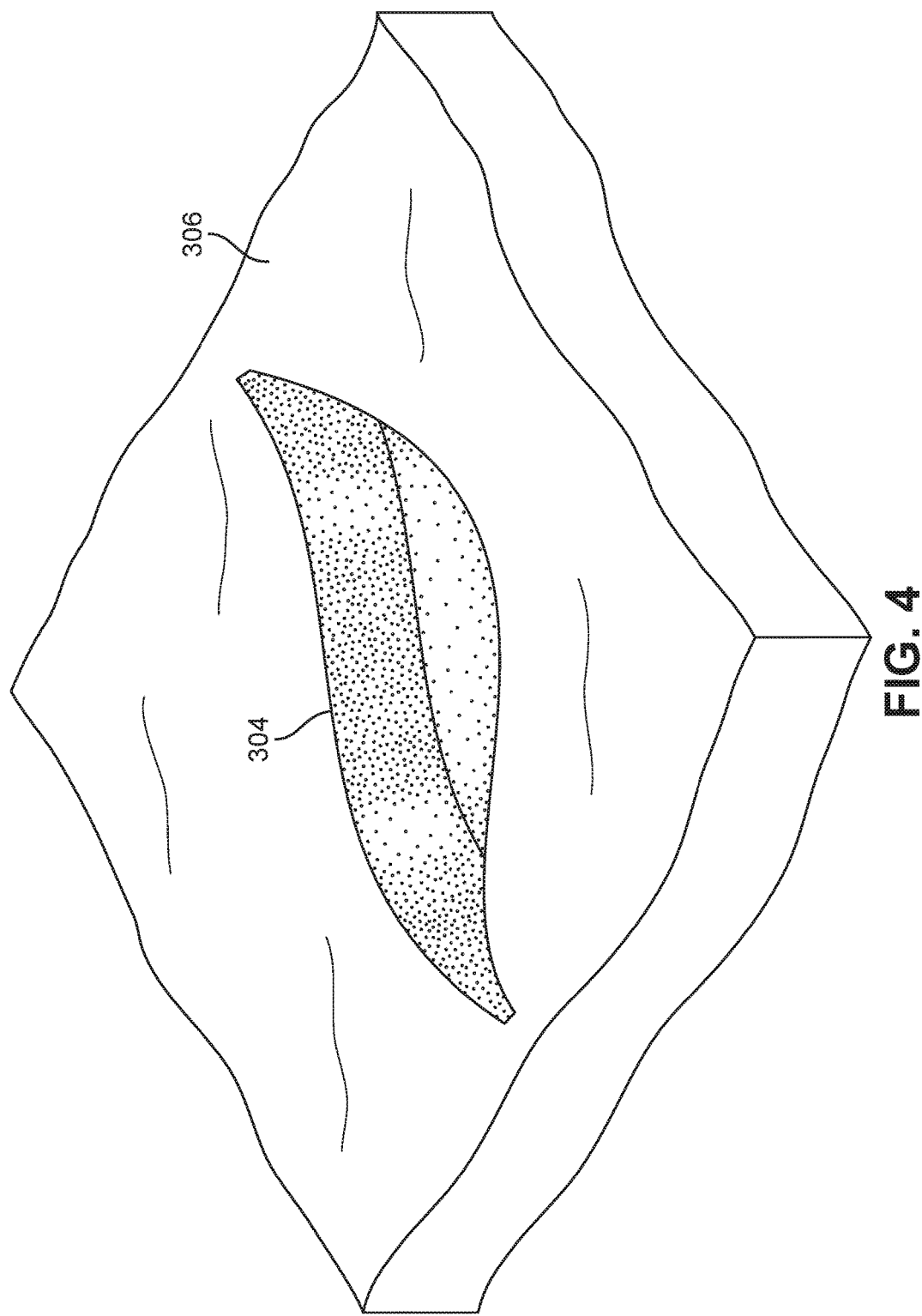
FIG. 4 is an isometric view of an embodiment of an irregularity having a deep groove.
Figure 5:
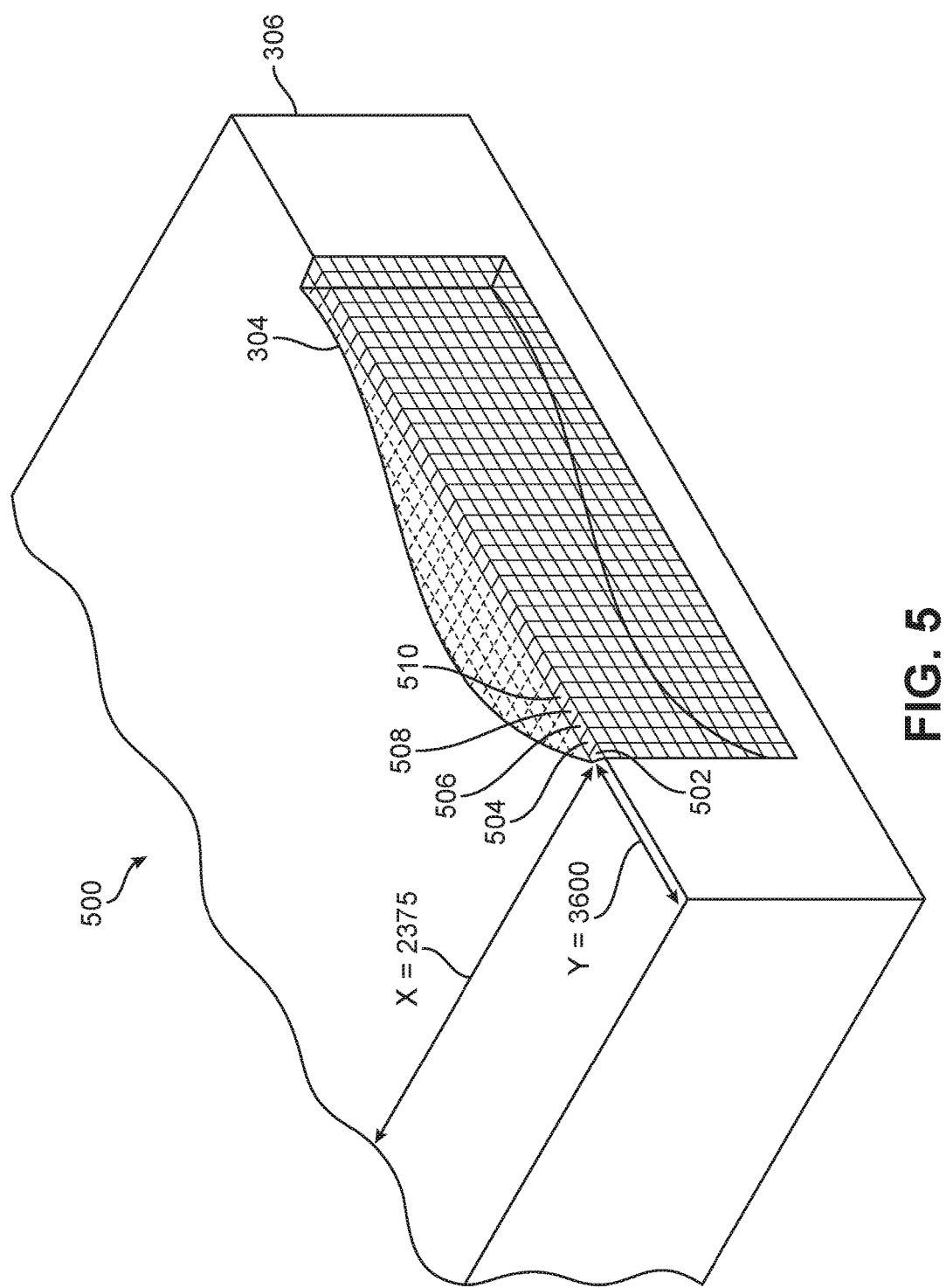
FIG. 5 is an isometric view of an embodiment of an irregularity having a deep groove of FIG. 4 shown at the pixel level.

As shown in FIGS. 4 and 5, article 306 has a deep groove 304. FIG. 5 illustrates an enlarged view 500 of deep groove 304. FIG. 5 shows a cross-section of deep groove 304. Sensing device 132 may detect the depth of deep groove 304 by providing optical information to the control unit. In some embodiments, article 306 could have a size of 11×16 inches. The control unit and sensing device 132 could convert the article size to an image size representing the image in pixels. It will be understood that the size of each pixel can be varied in different embodiments. Therefore, an article size of 11×16 inches could have an image size of 3300×4800 pixels. FIG. 5 shows pixels at the X coordinate of 2375. X=2375 represents the $2375^{th}$ pixel from the reference point of an edge of the article. For purposes of clarity, the Y coordinate will be discussed at the first 5 pixel locations. As shown in FIG. 5, since deep groove 304 has a similar depth throughout the X plane, only a few pixel locations will be discussed.

FIG. 6 shows the coordinate locations of deep groove 304 at the X coordinate of 2375. At pixel location 502, the X coordinate is equal to 2375, and the Y coordinate is equal to 3600. At this pixel location, the depth of the irregularity is 12 units deep. At pixel location 504, the X coordinate is equal to 2375, and the Y coordinate is equal to 3601. At this pixel location, the depth of the irregularity is 12 units deep. At pixel location 506, the X coordinate is equal to 2375, and the Y coordinate is equal to 3602. At this pixel location, the depth of the irregularity is 12 units deep. At pixel location 508, the X coordinate is equal to 2375, and the Y coordinate is equal to 3603. At this pixel location, the depth of the irregularity is 12 units deep. At pixel location 510, the X coordinate is equal to 2375, and the Y coordinate is equal to 3604. At this pixel location, the depth of the irregularity is 12 units deep. The unit of depth of each pixel may correspond to a linear dimension of a pixel. In some cases, each unit of depth may be equal in magnitude to the width of a pixel. In other cases, a unit of depth could be less than or greater than the width of a pixel. This surface image information could be generated by using sensing device 132 and computing system 120 to determine the depth of deep groove 304.

Referring to FIG. 2, in step 208, the surface image information could be analyzed by the control unit. Throughout this detailed description and claims, the control unit may utilize the sensing device 132, computing system 120, printing device 110, and/or a combination of them to analyze the surface image information. In step 210, surface contour map information may be created, as shown in FIG. 5. The article size could be converted to the image size represented by pixels. The location of the irregularity or cavity could be defined by the pixel coordinates. For example, FIG. 5 shows the deep groove 304 at pixel location 502 having coordinates of X=2375 and Y=3600. The control unit could detect the depth of the irregularity or cavity at each pixel location using any of the depth detecting technologies previously discussed. For example, FIGS. 5 and 6 show the depth of the irregularity as 12 units deep at each of the pixel locations. The depth could be a distance from the top of the surface of article 306 to the bottom of the irregularity or cavity.

In step 212, the predetermined thickness of a layer file may be adjusted or modified to compensate for any irregularities on the surface of article 306. The control unit may dynamically modify a predetermined thickness of a layer file to be printed on article 306 based on the depth of the cavity of deep groove 304. In an exemplary embodiment, the control unit may correct for the surface being moderately non-planar by printing the modified layer to fill in the irregularity or cavity. The control unit could modify a certain number of layer files as needed to fill in the irregularity or cavity to make the article smooth so that printing device 110 could print an unmodified layer file on a smooth surface.

Figure 7:
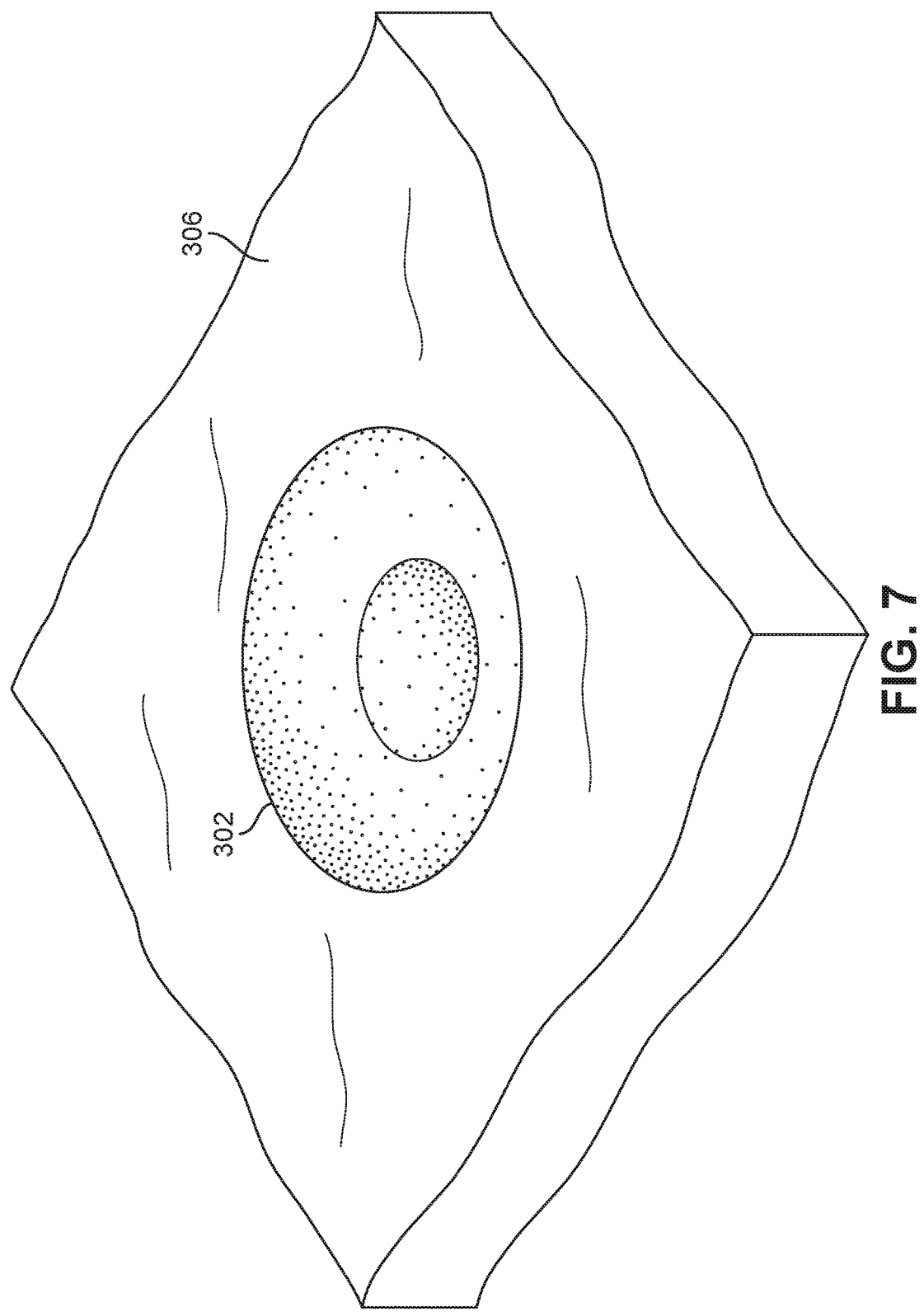
FIG. 7 is an isometric view of an embodiment of an irregularity having a shallow groove.
Figure 8:
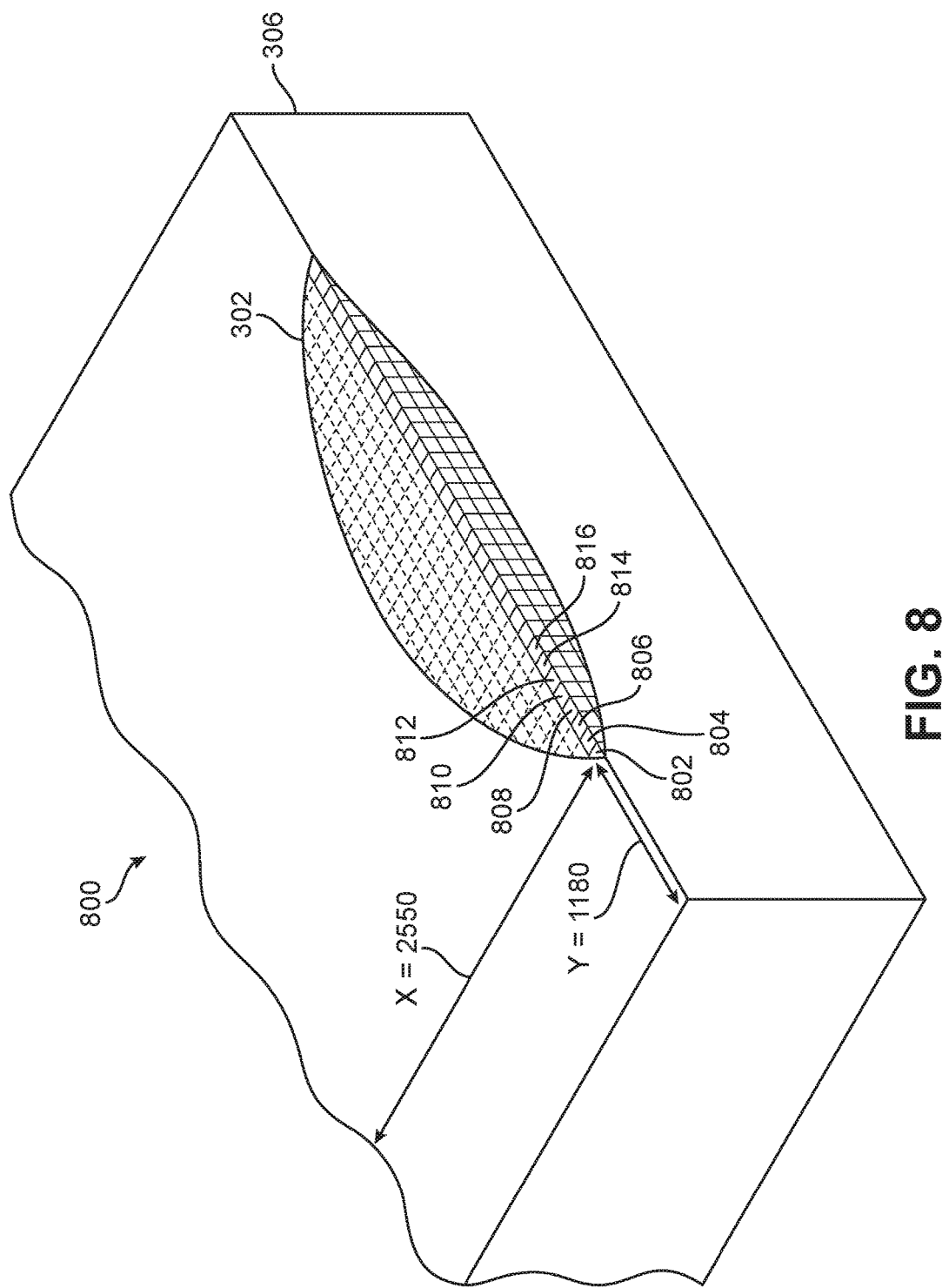
FIG. 8 is an isometric view of an embodiment of an irregularity having a shallow groove of FIG. 7 shown at pixel scale.

As shown in FIGS. 7 and 8, article 306 has an irregularity shown as shallow groove 302. FIG. 8 illustrates an enlarged view 800 of shallow groove 302. FIG. 8 shows a cross-section of shallow groove 302. Sensing device 132 may detect the depth of shallow groove 302 by providing optical information to the control unit. In some embodiments, article 306 could have a size of 11×16 inches. The control unit and sensing device 132 could convert the article size to an image size represented by pixels. Therefore, an article size of 11×16 inches could have an image size of 3300×4800 pixels. FIG. 8 shows pixels at the X coordinate of 2550. X=2550 represents the $2550^{th}$ pixel from the reference point of an edge of the article. For purposes of clarity, the Y coordinate will be discussed showing the varying depths of shallow groove 302.

FIG. 9 shows the coordinate locations of shallow groove 302 at the X coordinate of 2550. At pixel location 802, the X coordinate is equal to 2550, and the Y coordinate is equal to 1180. At this pixel location, the depth of the irregularity is 1 unit deep. At pixel location 804, the X coordinate is equal to 2550, and the Y coordinate is equal to 1181. At this pixel location, the depth of the irregularity is 1 unit deep. At pixel location 806, the X coordinate is equal to 2550, and the Y coordinate is equal to 1182. At this pixel location, the depth of the irregularity is 2 units deep. At pixel location 808, the X coordinate is equal to 2550, and the Y coordinate is equal to 1183. At this pixel location, the depth of the irregularity is 2 units deep. At pixel location 810, the X coordinate is equal to 2550, and the Y coordinate is equal to 1184. At this pixel location, the depth of the irregularity is 2 units deep. At pixel location 812, the X coordinate is equal to 2550, and the Y coordinate is equal to 1185. At this pixel location, the depth of the irregularity is 2 units deep. At pixel location 814, the X coordinate is equal to 2550, and the Y coordinate is equal to 1186. At this pixel location, the depth of the irregularity is 3 units deep. At pixel location 816, the X coordinate is equal to 2550, and the Y coordinate is equal to 1187. At this pixel location, the depth of the irregularity is 3 units deep. The unit of depth of each pixel may correspond to a linear dimension of a pixel. In some cases, each unit of depth may have the same width of a pixel. This surface image information could be generated by using sensing device 132 and computing system 120 to determine the depth of shallow groove 302.

Referring to FIG. 2, in step 208, the surface image information could be analyzed by the control unit. In step 210, surface contour map information may be created, as shown in FIG. 8. The article size could be converted to the image size represented by pixels. The location of the irregularity or cavity could be defined by the pixel coordinates. For example, FIG. 8 shows shallow groove 302 at pixel location 802 having coordinates of X=2550 and Y=1180. The control unit could detect the depth of the irregularity or cavity at each pixel location using any of the depth detecting technologies previously discussed. For example, FIGS. 8 and 9 show the depth of the irregularity having varying depths at each of the pixel locations. At pixel location 804, the depth of the irregularity is 1 unit deep. Shallow groove 302 also shows at pixel location 814, the depth of the irregularity as 3 units deep. The depth could be a distance from the top of the surface of article 306 to the bottom of the irregularity or cavity. The control unit could determine the depth of a cavity even if the cavity has varying depths.

In step 212, the predetermined thickness of a layer file may be adjusted or modified to compensate for any irregularities on the surface of article 306. The control unit may dynamically modify a predetermined thickness of a layer file to be printed on article 306 based on the depth of the cavity of shallow groove 302. In an exemplary embodiment, the control unit may correct for the surface being slightly non-planar by printing the modified layer to fill in the cavity. The control unit could modify a certain number of layer files as needed to fill in the irregularity or cavity to make the article smooth so that printing device 110 could print an unmodified layer file on a smooth surface.

FIG. 10 illustrates a schematic view of an article having different irregularities. Article 1002 could have an irregularity with shallow cavity 1012, moderate cavity 1014 and deep cavity 1016. As discussed above, the depth of the irregularity could be represented by units of depth that may correspond to a linear dimension of a pixel. Shallow cavity 1012 has shallow depth 1018 with a depth of one unit. Moderate cavity 1014 has moderate depth 1020 with a depth of 3 units. Deep cavity 1016 has deep depth 1022 with a depth of 12 units. In some embodiments, sensing device 132 and computing system 120 could detect the depth of a cavity on the surface of article 1002. The control unit may adjust a predetermined thickness of a layer file to be printed on article 1002 based on the depth of the cavities on the surface.

FIGS. 11-14 illustrate a schematic view of multiple layers printed on article 1002. In one embodiment, the layer files to create an image, graphic, or structure has predetermined thickness 1034. Some of the layers are printed from layer files having predetermined thickness 1034. Other layers are printed from modified layer files that include adjusted predetermined thicknesses or modified thicknesses to compensate for the different irregularities on the surface of article 1002. Printing device 110 could print any number of layers from layer files or modified layer files or a combination of layer files and modified layer files to create a desired image, graphic, or structure on article 1002.

FIG. 11 illustrates a schematic view of first layer 1004 printed on article 1002. As used herein and throughout this description, each layer could have an upper surface or top surface which corresponds to the exposed portion of the layer. The exposed portion could be covered by another layer or remain exposed. Also, each layer could have a lower surface or bottom surface, opposite the upper surface, which corresponds to the portion of the layer adjacent the substrate or the exposed portion of a layer which has already been printed. A base layer could be adjacent the substrate by printing the base layer directly onto the substrate. Any subsequent layer could be adjacent a previously printed layer by printing the subsequent layer directly onto the previously printed layer.

First layer 1004 is printed from a modified layer file that has predetermined thickness 1034 and multiple modified thicknesses. First portion 1036 of first layer 1004 has shallow modified thickness 1024 to fill shallow cavity 1012. Further, second portion 1038 of first layer 1004 has moderate modified thickness 1026 to fill moderate cavity 1014. To partially fill deep cavity 1016, third portion 1040 of first layer 1004 has deep modified thickness 1028. Deep cavity 1016 is partially filled thereby forming another cavity with thickness 1030 which extends from a top surface of first layer 1004 to a top surface of deep modified thickness 1028. Since first layer 1004 may not completely fill deep cavity 1016, another layer representing information from a modified layer file could be printed on the top surface of first layer 1004.

After first layer 1004 has been printed, portions of first layer 1004 could be continuous or flat. First portion 1036 shows shallow cavity 1012 completely filled with first layer 1004 which has upper surface 1025. Fourth portion 1029 shows a non-adjusted portion of first layer 1004 which has predetermined thickness 1034 with predetermined thickness upper surface 1027. Since shallow cavity 1012 is completely filled, upper surface 1025 is flush with predetermined thickness upper surface 1027 to provide a smooth and continuous surface from first portion 1036 to fourth portion 1029.

Upper surface 1025 and predetermined thickness upper surface 1027 are in the same plane providing a smooth flat surface without any cavities or irregularities. A subsequent layer printed onto first layer 1004 could have a portion of the layer adjacent to first portion 1036 and fourth portion 1029 having the predetermined thickness. Fifth portion 1043 shown in FIG. 12, shows second layer 1006 with predetermined thickness 1034. Since there were no cavities or irregularities detected at fifth portion 1043, that portion of the layer file was not modified and printing device 110 could print that portion of second layer 1006 directly onto the smooth portion of the top surface of first layer 1004.

FIG. 12 illustrates a schematic view of second layer 1006 printed onto the top surface of first layer 1004. Second layer 1006 is printed from a modified layer file that has predetermined thickness 1034 and modified thickness 1032. Second layer 1006 has predetermined thickness 1034 on the smooth surface portions of first layer 1004. Portion 1042 of second layer 1006 has modified thickness 1032 to fill the remaining portion of deep cavity 1016. Since first layer 1004 may be substantially smooth at portions around shallow cavity 1012 and moderate cavity 1014, second layer 1006 may print predetermined thickness 1034 directly onto the surface of first layer 1004. Each layer file could be modified or adjusted to compensate for irregularities found on the surface of the article. A modified layer file could have an adjusted predetermined thickness at the location or position of the irregularity.

FIG. 13 illustrates a schematic view of third layer 1008 printed onto the top surface of second layer 1006. Third layer 1008 is printed from a layer file having predetermined thickness 1034. Since second layer 1006 may be substantially smooth or flat, the layer file was not modified and printing device 110 could print third layer 1008 directly onto the top surface of second layer 1006 without adjusting a predetermined thickness.

FIG. 14 illustrates a schematic view of performance ribs 1010 printed on article 1002. In some embodiments, since third layer 1008 may be substantially smooth, printing device 110 may print performance ribs 1010 directly onto third layer 1008 without adjusting a predetermined thickness of the layer file for performance ribs 1010. In other embodiments, other layers may be printed from layer files onto third layer 1008 to create an image, graphic, or structure.

Figure 15:
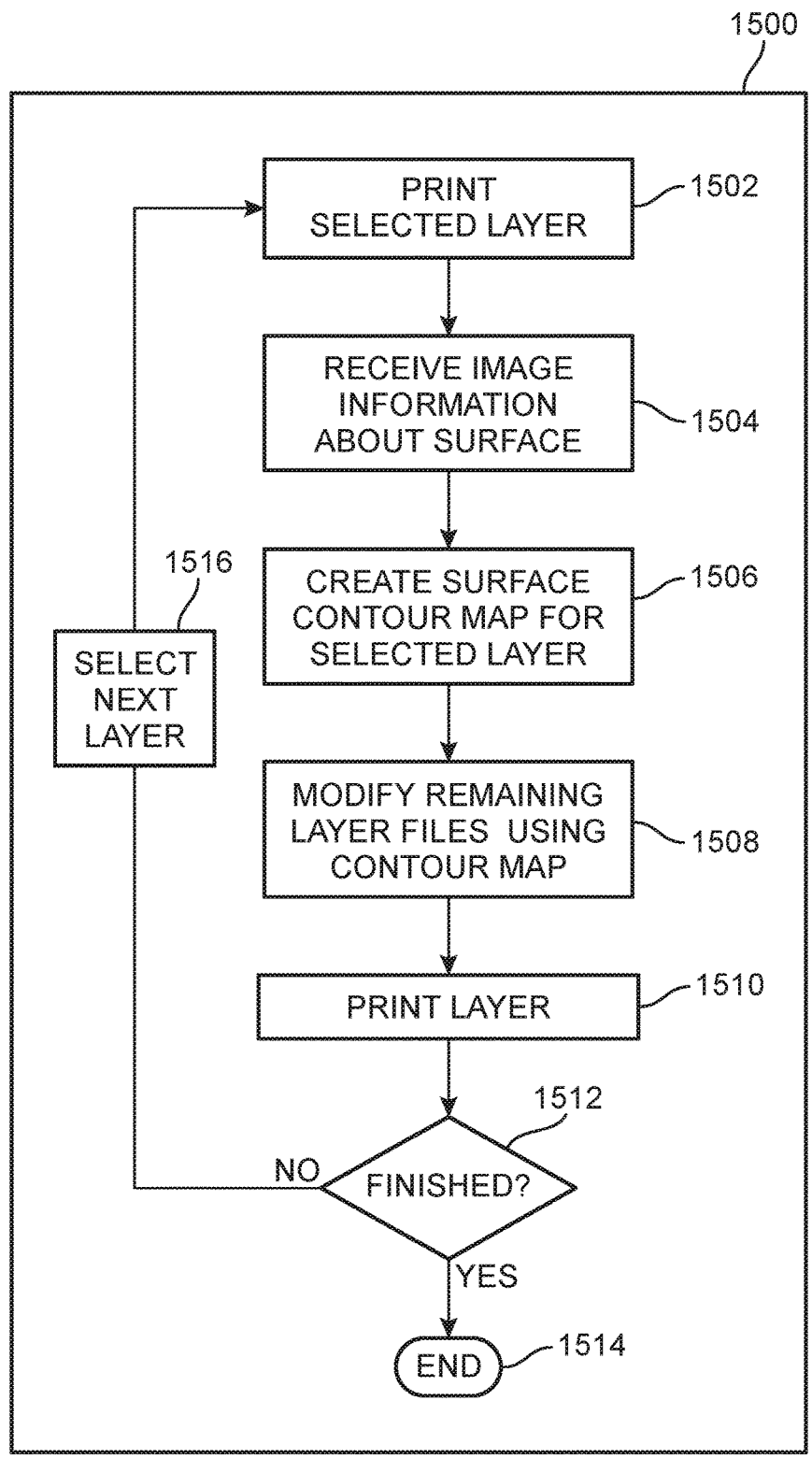
FIG. 15 is another embodiment of a process of printing on an article having irregularities.

FIG. 15 illustrates another embodiment of a process for printing on an article having irregularities. Process for printing 1500 shows that after every layer is printed, the resulting surface could be analyzed again to determine the depth of any irregularity on the surface and modify the next layer file to compensate for any irregularity. In step 1502, printing device 110 may print a selected layer (e.g., an Nth layer of the layer file). The selected layer could be substrate 102 placed on tray 114. Also, the selected layer could be any intervening layer in forming the desired image, graphic, or structure. In step 1504, a control unit may receive image information corresponding to a surface of the selected layer. In some embodiments, the image information may be received from one or more sensors, such as sensing device 132. The received image information could include any kind of analog and/or digital signal that include information related to one or more images captured by sensing device 132.

In step 1506, surface contour map information of the selected layer may be created. The contour map information may be used to detect the depth of any irregularity and provide the depth amount of irregularities on the surface of substrate 102. The depth amount or information may be a distance from the surface to a viewpoint of sensing device 132. In some embodiments, the surface of substrate 102 may be the planar or smooth surface portion of substrate 102. In other embodiments, the surface of substrate 102 may be the surface of the irregularity of substrate 102. Sensing device 132 could detect the depth of the irregularity using any of the technologies mentioned earlier.

In step 1508, the control unit could modify the next layer file using the contour map information. In some embodiments, the layer files could be image files, grayscale files, or any other kind of information files, as previously discussed, of the structure to be printed. The next layer file could be modified to fill the irregularity on the surface of the substrate with a depositing material. The layer files could contain information pertaining to the predetermined thickness for each layer. The next layer file could be modified based on the surface contour map information created in step 1506. The control unit may utilize the surface contour map information to modify or adjust the predetermined thickness of the next layer file based on the depth amount of the irregularities. The next layer file could be modified at the position or location of the irregularity. The other positions or locations of the next layer file could maintain their predetermined thickness. In step 1508, the next layer file could be adjusted or modified in a similar manner as the previous layer file or could be modified differently depending on the depth amount of the irregularity. The modified layer could be printed onto the selected layer and fill the cavity or irregularity to make the substrate substantially smooth.

The control unit could contain information pertaining to the number of layers to be printed to achieve the three-dimensional structure. Each layer file could be printed a predetermined number of times depending on the desired structure. In some embodiments, each layer file will be the same. In other embodiments, some layer files could be modified to correct for any irregularity on the surface of the substrate. In step 1510, printing device 110 could print the modified layer having a modified predetermined thickness onto the substrate.

In step 1512, the structure to be printed may be complete, and the printing process is finished in step 1514. In some embodiments, the structure may not be complete, and sensing device 132 may detect the depth of any resulting cavity after the selected layer has been printed. In step 1516, the next layer to be printed is selected and the process is repeated. The predetermined thickness of a layer could be adjusted based on the contour map information from the resulting cavity. Printing device 110 could print this modified predetermined thickness layer on top of the previous layer. In some embodiments, this process may continue until all of the cavities or irregularities have been completely filled. Once the surface of the substrate is substantially smooth, the remaining layer files could be printed without being modified.

While various embodiments have been described, the description is intended to be exemplary, rather than limiting, and it will be apparent to those of ordinary skill in the art that many more embodiments and implementations are possible that are within the scope of the invention. Any feature of any embodiment may be used in combination with or substituted for any other feature or element in any other embodiment unless specifically restricted. Accordingly, the invention is not to be restricted except in light of the attached claims and their equivalents. Also, various modifications and changes may be made within the scope of the attached claims.

What is claimed is:

1. A method of printing onto a base, the method comprising:
   receiving the base on a platform;
   detecting a first depth of a first cavity on the base with a sensing device;
   detecting a second depth of a second cavity on the base that is greater than the first depth of the first cavity;
   receiving an image file of a structure to be formed on the base;
   wherein the image file includes a predetermined thickness of a layer;
   generating a modified image file using the first depth and the second depth, wherein the modified image file includes a first adjusted thickness for a first portion of the layer corresponding to the first cavity and a second adjusted thickness for a second portion of the layer corresponding to and being less than the second depth of the second cavity; and
   printing a base layer directly onto the base using the modified image file, wherein the base layer includes a first adjusted portion printed within the first cavity, wherein the first adjusted portion has the first adjusted thickness, wherein the base layer includes a non-adjusted portion printed onto the base, wherein the non-adjusted portion has the predetermined thickness, and wherein the base layer includes a second adjusted portion printed within the second cavity, wherein the second adjusted portion has the second adjusted thickness.

2. The method according to claim 1, wherein the first adjusted portion fills the first cavity and an upper surface of the first adjusted portion is flush to an upper surface of the non-adjusted portion, and wherein the second adjusted portion partially fills the second cavity and an upper surface of the second adjusted portion is not flush with the upper surfaces of the non-adjusted portion or the first adjusted portion.

3. The method according to claim 2, further comprising printing a second layer on an upper surface of the base layer, wherein the second layer is printed from the image file.

4. The method according to claim 1, wherein the structure is a three-dimensional object.

5. The method according to claim 1, wherein the second adjusted portion only partially fills the second cavity.

6. The method according to claim 1, wherein the base comprises a portion of an article of footwear.

7. The method according to claim 1, wherein the sensing device is an optical sensing device.

8. The method according to claim 2, wherein after printing the base layer directly onto the base using the modified image file the method further comprises:
   curing the base layer;
   detecting a third depth of a third cavity, wherein the third cavity extends from an upper surface of the first non-adjusted portion to an upper surface of the second adjusted portion;
   printing a final printed layer, wherein after printing the final printed layer, the first cavity and the second cavity are completely filled; and
   curing the final printed layer, wherein after curing the final printed layer, the final printed layer is flat.

9. The method according to claim 8, wherein after detecting the third depth of the third cavity and prior to printing the final printed layer, the method further comprises:
   printing an intermediate printed layer, wherein the intermediate printed layer only partially fills the third cavity; and
   curing the intermediate printed layer.

10. A method of printing a three-dimensional structure onto a base comprising:
    receiving an image file corresponding to a two-dimensional representation of the three-dimensional structure, wherein the image file includes a predetermined thickness of a layer;
    receiving the base having a first cavity with a first depth and a second cavity with a second depth;
    detecting the first depth of the first cavity and detecting the second depth of the second cavity with a sensing device, wherein the second depth is greater than the first depth;
    generating a modified image file using the first depth and the second depth, wherein the modified image file includes a first adjusted thickness of a first portion of the layer corresponding to the first cavity and being greater than the first depth, and wherein the modified image file includes a second adjusted thickness of a second portion of the layer corresponding to the second cavity and being less than the second depth;
    printing a base layer directly onto the base using the modified image file, wherein the base layer includes a first adjusted portion printed within the first cavity and a first non-adjusted portion printed onto the base;
    wherein the first adjusted portion has the first adjusted thickness and fills the first cavity and the first non-adjusted portion has the predetermined thickness;
    wherein an upper surface of the first adjusted portion is continuous with an upper surface of the first non-adjusted portion; and
    wherein the base layer further includes a second adjusted portion printed within the second cavity, wherein the second adjusted portion has the second adjusted thickness and partially fills the second cavity thereby forming a third cavity that extends from an upper surface of the first non-adjusted portion to an upper surface of the second adjusted portion.

11. The method according to claim 10, further comprising detecting a third depth of the third cavity;
generating a second modified image file using the third depth, wherein the second modified image file includes a third adjusted thickness of a third portion of the layer corresponding to the third cavity; and
printing a second layer directly onto the base layer using the second modified image file, wherein the second layer includes a third adjusted portion printed within the third cavity and a second non-adjusted portion printed onto the base layer, wherein the third adjusted portion has the third adjusted thickness and the second non-adjusted portion has the predetermined thickness.

12. The method according to claim 11, wherein the third adjusted portion fills the third cavity and an upper surface of the third adjusted portion is continuous with an upper surface of the second non-adjusted portion.

13. The method according to claim 12, further comprising,
printing a third layer directly onto an upper surface of the second layer using the image file, wherein the third layer has a thickness that is constant and equal to the predetermined thickness.

14. The method according to claim 10, wherein the sensing device is a digital image sensor.

15. A system of printing onto a base comprising:
a control system configured to:
receive information about depths of cavities on a surface of the base, wherein the received information includes a first depth of a first cavity and a second depth of a second cavity;
receive an image file of a structure having a predetermined thickness of a layer to be printed on the base;
adjust the image file based on the first depth of the first cavity and the second depth of the second cavity;
generate an adjusted image file having a first adjusted thickness for a first portion of the layer corresponding to the first cavity and a second adjusted thickness for a second portion of the layer corresponding to the second cavity, wherein the first adjusted thickness is greater than the first depth of the first cavity, and wherein the second adjusted thickness is less than the second depth of the second cavity; and
transmit the adjusted image file to a printing device, the printing device configured to:
receive the adjusted image file; and
print a base layer directly onto the base using the adjusted image file, wherein the base layer includes an adjusted portion having the first adjusted thickness and the second adjusted thickness and includes a non-adjusted portion having the predetermined thickness.

16. The system according to claim 15, wherein the image file is a grayscale file of the structure.

17. The system according to claim 16, wherein the adjusted portion completely fills the first cavity and an upper surface of the first adjusted portion is on a same plane as an upper surface of the non-adjusted portion, and wherein the adjusted portion only partially fills the second cavity and an upper surface of the second adjusted portion is on different plane than the upper surface of the non-adjusted portion.

18. The system according to claim 15, wherein the printing device is further configured to print another layer onto an upper surface of the base layer using the image file having the predetermined thickness.

19. The system according to claim 15, wherein the structure is a three-dimensional object.

20. The system according to claim 15, wherein the control system further comprises a sensing device to detect information about the depths of the cavities.

* * * * *